United States Patent

Suchomel et al.

[15] 3,665,441
[45] May 23, 1972

[54] METHOD AND APPARATUS FOR DETECTING AEROSOLS

[72] Inventors: Michael Suchomel, Mountainside; William Tipton, Newark, both of N.J.; James H. Burnett, Wilton, Conn.

[73] Assignees: General Signal Corporation, Rochester, N.Y.; Edwards Company, Inc., Norwalk, Conn.

[22] Filed: Sept. 14, 1970

[21] Appl. No.: 72,103

Related U.S. Application Data

[63] Continuation of Ser. No. 702,881, Feb. 5, 1968, abandoned.

[52] U.S. Cl. ................................. 340/237 S, 250/83.6 FT
[51] Int. Cl. ............................................. G08b 17/10
[58] Field of Search ............ 340/237 S; 250/43.5 D, 83.6 FT, 250/44

[56] References Cited

UNITED STATES PATENTS 3,448,261  6/1969  Amiragoff...........................250/43.5

Primary Examiner—John W. Caldwell
Assistant Examiner—Daniel Myer
Attorney—Harold S. Wynn

[57] ABSTRACT

Apparatus whereby the presence of aerosols in an atmosphere is detected by measuring the level of the ion current through a chamber open to the atmosphere, wherein an electric field impressed across the electrodes of the chamber is selected within a range of values maximizing the effect of aerosols on the level of the current through the chamber and the signal developed relative to the chamber current is detected by circuitry including a metal oxide silicon field effect transistor.

6 Claims, 1 Drawing Figure

PATENTED MAY 23 1972
3,665,441
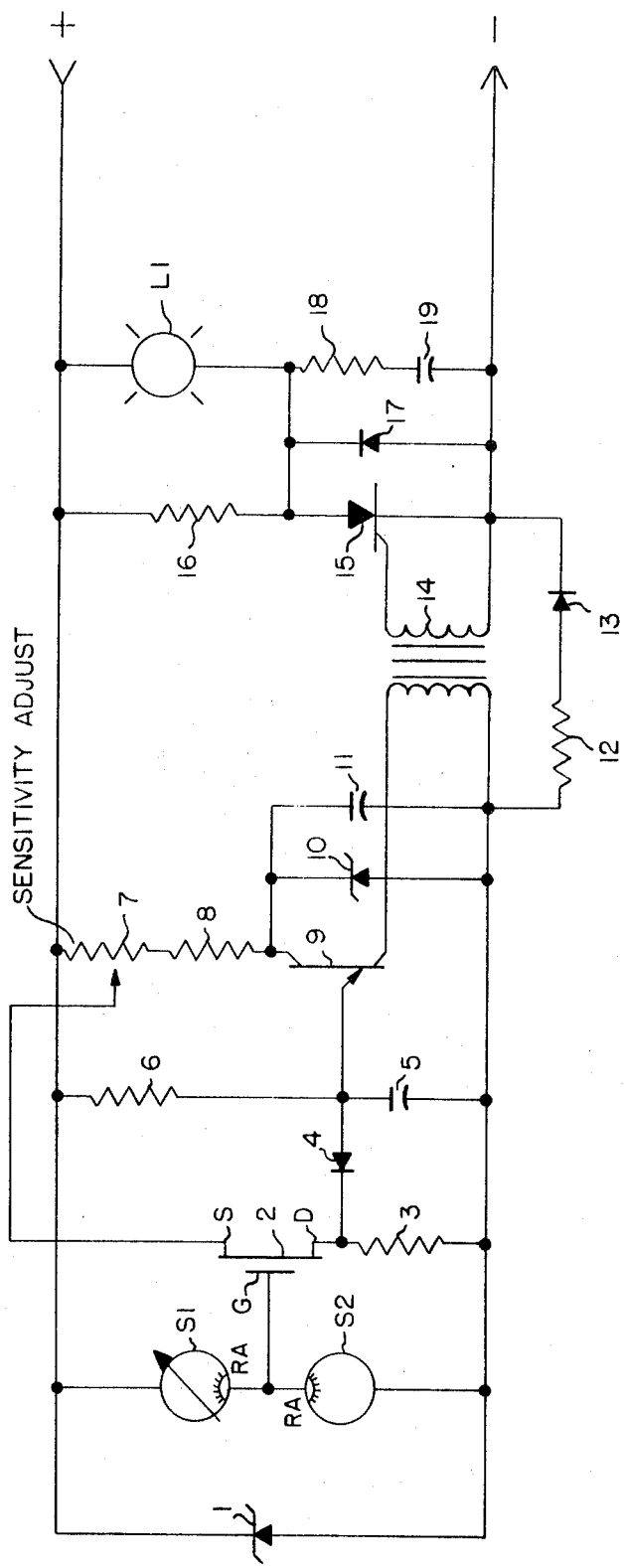
INVENTORS
J. H. BURNETT
M. SUCHOMEL
W. C. TIPTON
BY
*Jeremiah Duggan*
ATTORNEY

METHOD AND APPARATUS FOR DETECTING AEROSOLS

This is a continuation of the prior application, Ser. No. 702,881, filed Feb. 5, 1968, now abandoned.

BACKGROUND OF INVENTION

This invention relates to improved apparatus for indicating the presence of atmospheric aerosols, and more particularly to a detector sensing the presence of aerosols by their effect upon an ion current through a chamber open to the atmosphere.

In the adequate protection of equipment and facilities from fire it has been found necessary to not only determine the presence of existing fires but more importantly to determine the existence of fires which may still be in an incipient stage. Fires even in incipient stages give off particles which may comprise gas molecules, water, dust, smoke, and other suspended matter, generally known as aerosols. The detection of these aerosols presents a means for indicating incipient fires and thereby their possible prevention.

The prior art describes a number of devices utilized in the detection of aerosols, mainly falling into the categories of photo and ionization effect. The latter of these categories has found widest acceptance and usefulness in the industry. Such a device is disclosed in the prior patent of Meili, U.S. Pat. No. 2,702,898, wherein a housing contains an inner isolated ion chamber and an outer ion chamber communicating with the atmosphere. Generally the air or gas between a pair of electrodes is ionized by any of a number of available sources preferably radioactive materials. The ionization of the gas gives rise to a current through the electrodes, when such electrodes are subjected to an electric field. This current consists of both positive and negative ions traveling between the electrodes.

Depending upon the spacing of the electrodes and the magnitude of the voltage applied, the ions passing between the plates require a finite transit time. If during this transit time ions are allowed to combine with the various suspended molecules and particles present as products from incipient combustion, the effective current through the electrodes is adversely affected resulting in a net decrease in ion current. As the number of aerosols increases, and thereby the number of possible combinations increases, the current is commensurately affected and the resultant current decrease may be used to indicate the presence of an incipient fire.

This phenomenon can be explained by realizing that the ions combined with the heavier and less mobile aerosol particles are appreciably slowed down in their transit of the space between the electrodes, thus directly producing a drop in ion current. In actual practice, the effect of the change in ion current produced by the products of combustion is extremely small and requires the most sensitive measuring circuitry in order to provide accurate threshold settings and early indication of potential fire.

In normal circuit configurations, the chamber containing the electrodes and open to the atmosphere, is arrayed in series with a resistive element across a source of applied voltage, and the potential of the junction between the chamber and the resistive element varies directly with the changes or alterations in the level of the ion current through the chamber. This potential is sensed and used to indicate the presence of an incipient fire when its variation exceeds a certain predetermined value relative to normal ion current. Due to the small variations relative to that level indicating fire, it is essential that this potential be measured by devices offering as high an input impedance as possible, thereby minimizing loading effects and resultant decrease in sensitivity. In the art, the use of cold cathode tubes has been found to provide the necessary requirements for successful operation, however, such devices do not offer the reliability and sensitivity that may be acquired through the use of semi-conductor devices. The use of transistors has met with difficulty due to the normally low input impedance and the resultant loss in sensivity.

A further disadvantage present in prior art systems is the utilization of a high electric field strength across the electrodes of the ionization chamber; it has been determined, contrary to expectations, that the use of high field intensity, while increasing the total ion current, apparently diminishes the effect of the aerosols upon this current by preventing maximum combination of aerosols with the ions present in the chamber. This effect is probably due to the low transit time of ions present in the chamber while under the coercion of a high accelerating voltage.

It is therefore an object of this invention to provide a more reliable and sensitive aerosol detector.

It is another object of this invention to provide an ionization type aerosol detector having a relatively low electric field strength impressed across the chamber electrodes.

It is another object of this invention to provide an ionization type detector wherein the signal developed relative to the current through the chamber electrodes is sensed by a field effect transistor.

It is still another object of this invention to provide an ionization type detector relatively insensitive to transient signals.

SUMMARY OF THE INVENTION

In accordance with this invention there is presented an improved apparatus for detecting the presence of aerosols in a designated atmosphere. A chamber is open to the atmosphere and has a pair of electrodes disposed therein, across which electrodes is maintained an electric field. A current is produced through the electrodes by ionizing the atmosphere within the chamber. A signal is generated relative to the current level through the electrodes and means responsive to the signal indicate whenever the current level falls below a predetermined value. The improvement of this apparatus comprises means for selecting the electric field strength across the electrodes to maximize the effect of atmospheric aerosols on the level of the current through the electrodes.

A further improvement in the apparatus includes the use of a field effect transistor as a high impedance device for indicating when the current falls below the predetermined value.

In accordance with this invention there is also presented an improved method for detecting the presence of aerosols. This new method comprises the steps of maintaining an electric field across a pair of electrodes and allowing the atmosphere to be present between the electrodes. The gas between the electrodes is ionized and the resultant current through the electrodes is measured; whenever this current falls below a predetermined value the presence of an incipient fire is indicated. The improvement in this method is selecting the electric field intensity so as to maximize the effect of aerosols on the level of the current through the electrodes and further the utilizing of a field effect transistor in measuring the level of the current.

The foregoing summary of invention and the advantages and objects of the invention will become more apparent upon the study of the drawing and the detailed description presented in the following paragraphs.

BRIEF DESCRIPTION OF THE DRAWING

The drawing of this application presents a detailed circuit of an ionization type aerosol detector embodying the invention.

DESCRIPTION OF THE PREFERRED EMBODIMENT

The detector of this invention is a low voltage aerosol detector of the ionization type. The following detailed description of its operation is made with reference to the drawing of this application.

The circuit is connected as shown by the + and − symbols to a direct current supply source for providing the necessary power and operating voltage. This source is regulated by a Zener diode 1, the characteristics of which maintain the voltage at the selected breakdown point of the diode. A resistor 12 in series with the diode 1 provides the necessary voltage drop to achieve the regulation characteristics of the Zener diode.

In this embodiment the diode 1 regulates the voltage across the ionization chambers S1 and S2. The second ionization chamber S2 is used as a reference or comparison chamber, and since S2 is open to the atmosphere while substantially closed to aerosols, it is apparent that any ambient changes affecting the level of ion current through the chambers will be effectively cancelled. Primary concern with respect to ambient changes, is directed to atmospheric density which under normal conditions produces a substantial change in ion current, this may indicate an incipient fire if only a single chamber were utilized; of course, in instances where such density variation is not an important factor then a single chamber in combination with a resistive element may be used in the practice of this invention.

Contained within the ion chamber and formed integrally with the chamber are pairs of electrodes across which the applied source voltage generates an electric field known and predetermined intensity. In actual application it has been found that a field intensity of less than 10 volts per cm. effectively provides adequate sensitivity to aerosol presence.

Contained in the chambers are sources of radio-active material indicated by the symbols RA; the emission of energy from these sources produces the necessary ionization of the atmosphere to permit proper operation of the detector. The chamber S1 is substantially opened to the atmosphere, freely allowing the entrance of both atmosphere and aerosols contained therein to the space between the electrodes. Chamber S2, the reference or compensating chamber, contains only a pin-hole connection to the atmosphere, allowing the entrance of gas while severely limiting the possible entrance of combustion products or materials. The transistor 2 is a metal oxide-silicon-field effect transistor having an extremely high input impedance, approximately $10^{12}$ ohms, or higher. Its terminal G is connected to the junction of chambers S1 and S2 and senses the voltage division between these two chambers. Normally the voltage division between the chambers S1 and S2 is set to maintain approximately 7 volts across the test chamber S1, thereby resulting in a field intensity of approximately 4 volts per cm. establishing the approximate 2 cm. spacing of the electrodes within the chamber. When aerosols enter the chamber S1 the ion current is decreased in accordance with the number of ion-particle combinations produced and results in increasing the voltage across test chamber S1.

Variable resistor 7 provides a sensitivity adjustment for the field effect transistor 2 while resistor 6, resistor 3, diode 4, and capacitor 5 comprise bias and output circuitry for the same transistor 2. The signal developed across capacitor 1 is conducted to the input of a uni-junction transistor 9, which in combination with transformer 14 provides an output signal to indicator circuitry. Variable resistor 7, resistor 8, Zener diode 10, and capacitor 11 comprise the remaining circuitry concerned with uni-junction transistor 9.

A silicon controlled rectifier 15 in combination with warning light L1 and resistor 16 provides indicator circuitry responsive to the output of transformer 14. Resistor 18 and capacitor 19 provide compensation for the indicator circuitry.

The presence of diodes 17 and 13 are arranged in the circuitry to both indicate and prevent respectively the application of an inverse polarity supply source.

In operation assuming the chamber S1 is subjected to atmosphere containing combustion products, the transistor 2 which has been normally in a non-conducting state becomes conducting when the voltage across chamber S1, due to resultant aerosol decrease in electrode current, exceeds a predetermined threshold voltage level. As transistor 2 begins to conduct the current passing through resistor 3, electrically connected between terminal D and the negative lead of the supply source, generates a voltage signal relative to the potential at the junction of chambers S1 and S2.

The voltage across chamber S1 increases, and the voltage signal appearing at the anode of diode 4 and capacitor 5 commences to follow the voltage developed across resistor 3. When the voltage appearing at this junction of diode 4 and capacitor 5 reaches a predetermined value, as established by uni-junction transistor 9 and its associated bias circuitry, the uni-junction transistor 9 switches on and becomes in effect a very low resistance path, thereby connecting capacitor 11 to the primary of transformer 14. Capacitor 5 then discharges through the primary of transformer 14 and generates a pulse in its secondary. This generated pulse is impressed across the gate control lead of silicon controlled rectifier 15 and causes it to assume a conductive state.

When silicon controlled rectifier 15 conducts, it places the entire supply voltage across load resistor 16 and indicator lamp L1, thereby indicating the presence of a potential existing fire by lamp illumination. Other remote warning or indicating circuitry may be attached across the load resistor to give suitable indication of fire and in addition, current sensing circuitry in the power supply may be similarly used to achieve this purpose. Any of the foregoing devices can be adequately used either alone or in combination to provide the indicator output signals.

In addition to the afore-described circuitry, the exemplary embodiment of this invention includes other components and circuits enhancing detector reliability and safety. These are briefly described in the following paragraph.

The combination of resistors 7 and 8 with Zener diode 10 provides a voltage divider arrangement, which regulates the voltage across uni-junction transistor, 9, principally by the regulator action of the Zener diode 10. This regulation and divider action reduces the standby current level of the detector.

The variable resistor 7 permits adjustment of the sensitivity of the detector and provides feedback from the uni-junction transistor 9 stage to the field effect transistor 2, thereby further increasing the sensitivity after initial detection.

The capacitor 11, across Zener diode 10, stabilizes the voltage across uni-junction transistor 9 and transformer 14. This integrating element provides stabilization and slows down any rise of voltage across the unijunction transistor 9 — transformer 14 combination, thereby preventing false triggering of the circuit due to spuriously developed signals or false indication of a transient nature.

Diode 13, as previously indicated protects the sensing circuit from accidental connection to the wrong polarity supply voltage, by effectively opening the circuit when polarity is reversed. The series combination of resistor 18 and capacitor 19 serves as a rate-of-rise filter across silicon controlled rectifier 15. This prevents any accidental firing or triggering of silicon controlled rectifier 15 which might be caused by any exceptionally high rate of voltage application across the detector circuit.

The diode 17, again as previously described, indicates any reverse connection of applied voltage to the detector circuit. As inspection of the drawing indicates, reverse application of voltage finds a series path through diode 17, and light L1 will be ignited. This provides a definite warning of malfunction, or improper connection.

Thus has been described an improved apparatus for detecting the presence of aerosols in an atmosphere, wherein the effect of aerosols on an ionization current between electrodes subjected to a relatively low electric field intensity is detected by sensing circuitry using a field effect transistor input device.

We claim:

1. Apparatus for detecting the presence of aerosols in the atmosphere having reference and measuring ionization chambers connected in series for sensing the presence of aerosols and a detector connected to a midpoint between the chambers for indicating an abnormal condition of the chambers wherein the improvement comprises:

a low voltage regulated power supply for energizing both the chambers and the detector
and wherein the detector comprises:

a field effect transistor having one of its gates connected to the midpoint for delivering an abnormal output in response to presence of aerosols in the measuring chamber;

a unijunction transistor having its gate electrode connected to the output of the field effect transistor for delivering an output in response to output above a normal level of the field effect transistor;

an integrating circuit connected to the gate of the unijunction transistor for rendering the unijunction transistor operable to deliver an output only after an abnormal output of the field effect transistor has persisted for a selected time interval;

a feedback circuit connected from the unijunction transistor to the field effect transistor for increasing the sensitivity of the detecting apparatus in response to the unijunction transistor being turned on;

silicon controlled rectifier means having its gate circuit governed by an output of the unijunction transistor for turning on an indicator; and a rate of rise filter for permitting actuation of the indicator only if output of the silicon controlled rectifier has persisted for a selected time interval.

2. The apparatus of claim 1 wherein said integrating circuit comprises: a resistor and capacitor serially coupled across the power supply, and a discharge circuit for said capacitor including:

an output resistor coupled to the drain of said FET and a diode connected normally to discharge said capacitor through said output resistor, the diode becoming biased to be non-conductive upon the occurrence of an abnormal output of said FET thereby permitting the capacitor to charge to a level sufficient to activate said unijunction.

3. The apparatus of claim 1 wherein said rate of rise filter comprises a resistor and capacitor serially coupled with said indicator for permitting actuation of said indicator in accordance with the time constant of said resistor-capacitor combination.

4. The apparatus of claim 1 further including: a zener diode means coupled across the chamber for regulating the potential across the chambers to a predetermined value regardless of loading of the power supply by the detection circuit.

5. The apparatus of claim 1 wherein said feedback loop comprises: a potentiometer coupled between the power supply and the unijunction transistor and having is slider terminal coupled to the source electrode of said field effect transistor whereby the sensitivity of said FET may be adjusted.

6. The apparatus of claim 5 including an output circuit for said unijunction transistor comprising: a capacitor coupled to the junction of the potentiometer and the unijunction transistor, said capacitor charged in accordance with the impedance of said potentiometer and capacitor combination when said unijunction is in a non-conductance state and discharged through said unijunction for delivering the output when said unijunction is in a conductance state; and a zener diode coupled across said unijunction and capacitor for regulating the bias on said unijunction.

* * * * *